United States Patent [19]

Hohmann et al.

[11] 4,408,056
[45] Oct. 4, 1983

[54] ANTHRAQUINONE VAT DYESTUFFS

[75] Inventors: Walter Hohmann, Leverkusen; Josef Stawitz, Cologne, both of Fed. Rep. of Germany

[73] Assignee: Bayer Aktiengesellschaft, Leverkusen, Fed. Rep. of Germany

[21] Appl. No.: 454,300

[22] Filed: Dec. 29, 1982

[30] Foreign Application Priority Data

Jan. 13, 1982 [DE] Fed. Rep. of Germany ....... 3200707

[51] Int. Cl.³ .............................................. C09B 5/26
[52] U.S. Cl. .................................................. 548/416
[58] Field of Search ........................................ 548/416

[56] References Cited

U.S. PATENT DOCUMENTS 2,459,424  1/1949  Hauser et al. ...................... 548/416
4,153,608  5/1979  Hohmann ........................... 548/416

Primary Examiner—Robert W. Ramsuer
Attorney, Agent, or Firm—Sprung, Horn, Kramer & Woods

[57] ABSTRACT

Nitrotrianthrimidecarbazoles of the formula

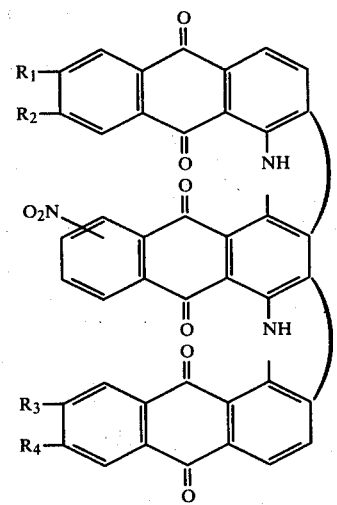

in which
the $NO_2$ group is in the α- or β-position and $R_1$, $R_2$; $R_3$ and $R_4$ designate hydrogen or halogen such as chlorine and bromine, their use as vat dyestuffs, a process for their preparation, and the use, as vat dyestuffs, of compounds which in the formula (I) have an $NH_2$ group in place of the $NO_2$ group.

2 Claims, No Drawings

ANTHRAQUINONE VAT DYESTUFFS

The invention relates to nitrotrianthrimidecarbazoles of the formula

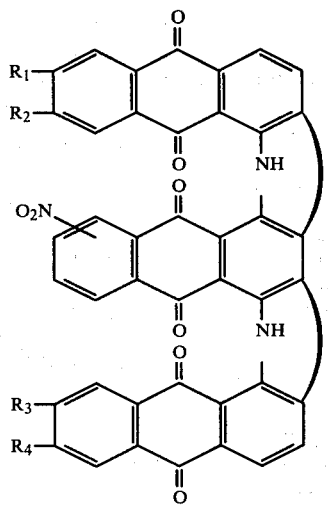

in which
the NO$_2$ group is in the α- or β-position and
R$_1$, R$_2$, R$_3$ and R$_4$ designate hydrogen or halogen, such as chlorine or bromine. Halogen preferably represents chlorine.

The compound in which the —NO$_2$ group is in the α-position and R$_1$, R$_2$, R$_3$ and R$_4$ designate hydrogen is particularly preferable.

The invention also relates to the use of compounds of the formula (I), as individual components or in mixtures, as vat dyestuffs.

When compounds of the formula (I) are used as vat dyestuffs, the nitro group can be reduced, at least partially, for example to the amino group, during the vatting.

The invention also relates to the use of compounds of the formula

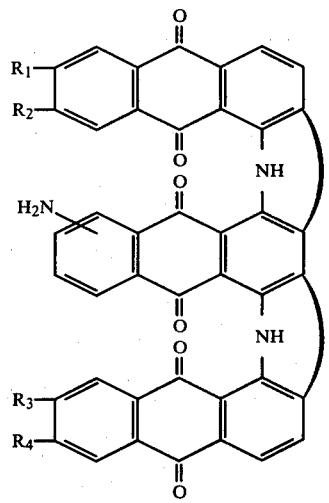

in which
NH$_2$ is in the α- or β-position and
R$_1$, R$_2$, R$_3$ and R$_4$ have the meanings indicated for the formula (I),
as individual components or in mixtures, as vat dyestuffs.

Those compounds are preferably used in which NH$_2$ is in the α-position and R$_1$, R$_2$, R$_3$ and R$_4$ designate hydrogen.

The invention also relates to a process for preparing compounds of the formula (I), which is characterized in that compounds of the formula

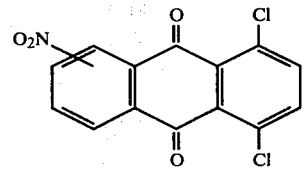

are reacted with aminoanthraquinones of the formulae

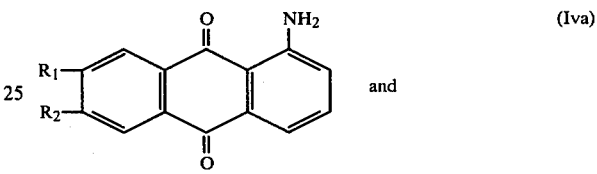

and

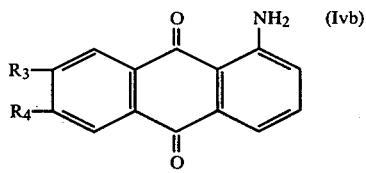

in which R$_1$, R$_2$, R$_3$ and R$_4$ have the meanings indicated for the formula (I) in an anthrimide melt, and the trianthrimides obtained are carbazolated by processes which are in themselves known in the presence of customary diluents, preferably pyridines. The reaction of (III) with (IVa) and (IVb) can be carried out in stages; however, for economic reasons it is advisable to react (III) with a mixture of (IVa) and (IVb).

Compounds of the formula (III) are in themselves known. They can be obtained by various processes, for example by the process described in German Auslegeschrift No. 1,161,252 or by nitrating 1,4-dichloroanthraquinone by methods which are in themselves known (see, for example, Chem. Zentralblatt 1910 I, page 2093), in which, initially, a mixture of compounds of the formula (III) with the NO$_2$ group in the α-position (main product) and in β-position (by-product) is formed.

However, the preferable, more economical, method is to chlorinate 1- or 2-nitroanthraquinone. In this method, the chlorine atoms very preferentially enter the α-positions of the unsubstituted ring.

To prepare 1,4-dichloro-5-nitroanthraquinone it is also possible to use crude, approximately 65 to 85% pure, 1-nitroanthraquinone, as obtained in mononitrations of anthraquinone. However, pure 1-nitroanthraquinone is preferably used, and it can be obtained, for example, in accordance with German Offenlegungsschrift No. 2,256,644. In this step, a crude, approximately 70 to 85% pure, product which is preferably used for preparing nitrotrianthrimide is obtained. However, in preparing nitrotrianthrimide it is also possible to use pure, for example 95 to 98% pure, 1,4-dichloro-5-nitroanthraquinone as a starting material.

Compounds of the formulae (Iva) and (Ivb) are also in themselves known. Examples which may be mentioned are 1amino-6,7-dihalogenoanthraquinones, preferably 1-amino-6,7-dichloroanthraquinone, 1-amino-6- or -7-monohalogenoanthraquinones, preferably 1-amino-6- and 1-amino-7-chloroanthraquinone, and, in particular, 1-aminoanthraquinone.

1-Aminoanthraquinone can be used as a crude product, as obtained, for example, by reducing 65 to 85% pure nitroanthraquinone by processes which are in themselves known in 60 to 85% purity. Approximately 85 to 90% pure 1-aminoanthraquinone is preferably used, and the approximately 98% pure product is very particularly preferably used.

Compounds of the formulae (III) and (Iva)+(Ivb) are preferably used in a molar ratio of III:(Iva+Ivb)=1:1.8 to 1:2.3, particularly preferably 1:2.0 to 1:2.1.

The new process takes a surprising course, in so far as (a) the chlorine atoms are selectively and virtually completely replaced by aminoanthraquinone groups in the anthrimide melt, and the nitro group is substituted or changed, either not at all or only to an extremely small extent; and (b) the nitro group is preserved virtually completely in the carbazolation and also in the working up, which is preferably carried out in a strongly alkaline medium at an elevated temperature.

Possible solvents or diluents in the anthrimide melt are advantageously those which dissolve a sufficient amount of the reactants and are inert under the reaction conditions, such as Tetralin, naphthalene, methylnaphthalene, diphenyl, diphenylmethane, dimethyldiphenyl, dimethylnaphthalene, diphenyl ether and nitrobenzene. Naphthalene and nitrobenzene, for economic reasons in particular nitrobenzene, are preferably used.

The amount of solvent depends on the procedure chosen.

Thus, carrying out the process in a blade drier requires amounts of only 0.5 to 1 part by weight, or the solvent can be completely dispensed with. In the solvent process in a stirred vessel, 4 to 6 parts by weight of solvent are preferably used.

Suitable catalysts are catalysts customary in an Ullmann reaction, such as Cu powder, CuCl, CuBr, Cu(OAc)$_2$, CuCl$_2$, CuBr$_2$ and mixtures of these compounds. Compounds having an alkaline reaction, and which are used for neutralising the hydrogen chloride formed in the reaction, are preferably hydroxides and carbonates of alkali metals and oxides, hydroxides and carbonates of alkaline earth metals and their basic salts, particularly preferably Na$_2$CO$_3$.

The amount of compounds having an alkaline reaction used in the process can be varied within wide limits. Approximately 2 to 20, advantageously 2 to 4, base equivalents are preferably used per mol of 1,4-dichloronitroanthraquinone used. The reaction temperature depends on the process chosen and on the solvent. It is in general between 160° and 230° C., particularly preferably between 195° and 205° C.

The reaction time depends on the reaction temperature chosen, and is preferably between 3 and 30 hours, between 8 and 12 hours at the preferable temperature.

The reaction can be readily monitored, using the customary chromatographic methods, by the decrease in the starting materials. Without disadvantage for the process, the reaction product can also contain, depending on the quality of the 1,4-dichloronitroanthraquinone used, 0.2 to 1.5% of residual chlorine and 2 to 5% of 1-aminoanthraquinone.

The product is worked up by methods which are in themselves known, for example by distilling off the solvent, if necessary under reduced pressure, by steam distillation or by filtration, if appropriate after prior dilution with a suitable solvent. Suitable solvents for the diluting are in particular those which are miscible with the solvents used for the reaction and in general those which have a low boiling point. A particular mention may be made of alcohols having 1 to 5 C atoms, hydrocarbons having 5 to 10 C atoms, such as toluene, and halogenated hydrocarbons.

The nitroanthrimide used in the carbazolation can contain salts, as a 60 to 75% pure material, as obtained on evaporation of the anthrimide melt, or can be substantially salt-free, as an approximately 70 to 85% pure material, as obtained in separating off the solvent by steam distillation, or can be the pure compound. The products obtained after the carbazolation do not differ in their colour.

The carbazolating reagents preferably used are anhydrous AlCl$_3$ and TiCl$_4$; AlCl$_3$ is particularly preferable. 0.4 to 1.5 parts by weight of AlCl$_3$, particularly preferably 0.6 to 1.0 parts by weight, are preferably used per part by weight of nitroanthrimide used. Examples of diluents used are quinoline and picoline, but pyridine is preferably used in amounts of 2 to 5 parts by weight.

The carbazolation temperature is preferably between 100° and 180° C., particularly preferably between 125° and 135° C.

To work up the products, customary processes can be used, such as steam distillation in the presence of sufficient strong alkali to convert the aluminium salts into soluble aluminates and, if appropriate, subsequent fining of the dyestuff by means of hypochlorite, nitrite, chlorate or dichromate. However, ulilisable dyestuffs are obtained even without fining.

German Patent Specification No. 867,724 discloses dyestuffs which contain an acylamino group instead of the NO$_2$ group of dyestuffs of the formula (I). The preparation of these dyestuffs requires 1,4-dichloro-5-acylaminoanthraquinone as an intermediate product. The preparation of this compound, using anthraquinone as a starting material, requires at least four reaction steps. In contrast, the 1,4-dichloro-5-nitroanthraquinone used according to the invention as an intermediate product requires for its preparation, starting from anthraquinone, only two steps. The economic advantage is obvious.

Dyestuffs of the formulae (I) and (II) are used as vat dyestuffs by customary processes. Dyeings with the nitro compounds have fastness properties similar to those of dyeings with the amino compounds, although, as a rule, the dyeings are not completely identical.

Because of the low fastness properties to be expected, nitroanthrimidecarbazoles have hitherto not been used in dyeing. It was therefore surprising that dyestuffs of the formula (I) are NO$_2$-containing vat dyestuffs of a high fastness level. It is also surprising that dyeings of the same hue are obtained very largely regardless of the particular dyeing conditions.

EXAMPLE 1

(a) 34.6 g of 98% pure 1-aminoanthraquinone, 25.0 g of approximately 80% pure 1,4-dichloro-5-nitroanthraquinone, 8.3 g of Na$_2$CO$_3$ and 0.5 g of copper powder are added to 200 ml of nitrobenzene, and the mixture is stirred. The melt is heated in the course of 1 hour to 200° to 205° C., maintained for 10 hours at this temperature and then evaporated in vacuo at 130° to 140° C. 63.9 g of a dark brown powder having a residual content of organically bonded chlorine of 0.8 to 1.0% are obtained.

(b) 12.0 g of anhydrous AlCl₃ followed at 100° C. by 20.0 g of the nitrotrianthrimide prepared according to paragraph (a) are added at 50° to 80° C. to 60 ml of pyridine. The temperature is increased to 130° C. while 10 to 20 ml of pyridine are distilled off, and this temperature is maintained for 2 hours. The warm melt is added to a mixture of 400 ml of water and 100 ml of 50% strength sodium hydroxide solution, the pyridine is distilled off using steam, and the temperature is maintained for 1 hour at 70° C. after 30 ml of chlorine liquor (about 13% of active chlorine) have been added. The solids are filtered off hot with suction, washed with hot water until neutral and dried at 100° C. 16.7 g of a dyestuff the main component of which is of the formula (I) are isolated. It dyes cotton deeply in reddish-tinged brown shades having good fastness properties.

(c) If methylpyridines or quinoline are used instead of pyridine, a dyestuff is obtained with somewhat lower tinctorial strength.

EXAMPLE 2

(a) 25.0 g of 1,4-dichloro-5-nitroanthraquinone (about 80% pure), 33.5 g of 1-aminoanthraquinone (98% pure), 8.6 g of Na₂CO₃ and 0.5 g of copper powder are added to 250 ml of a eutectic mixture of diphenyl and diphenyl ether (about 1:3). The melt is heated for 15 hours at 205° C. and then evaporated in vacuo. 62.8 g of a product which still contains 1.4 to 1.6% of organically bonded chlorine are obtained.

(b) The carbazolation analogously to paragraph (b) of Example 1 produces 16.9 g of a dyestuff which is virtually identical to that of Example 1.

Nitrotrianthrimide which has been boiled out and freed of inorganic salts can be used without disadvantage in the carbazolation instead of the salt-containing nitrotrianthrimide.

EXAMPLE 3

(a) 34.0 g of 1-aminoanthraquinone (98% pure), 8.3 g of Na₂CO₃, 25.0 g of 1,4-dichloro-5-nitroanthraquinone (about 80% pure) and 0.8 g of copper(I) chloride are added in succession at 140° C. to 200 ml of naphthalene. The melt is heated for 15 hours at 200° C. The temperature is allowed to reduce to 130° to 140° C., and the melt is diluted with 200 ml of toluene. The solids are filtered off with suction at about 25° C., washed with 100 ml of toluene and dried in vacuo. 49.6 g of a product which still contains 0.2 to 0.4% of organically bonded chlorine are obtained.

(b) The carbazolation analogously to paragraph (b) of Example 1 produces 17.4 g of a dyestuff which, compared to the dyestuff of Example 1, is equal in hue but stronger in tinctorial strength.

EXAMPLE 4

(a) 35.0 g of 98% pure 1-aminoanthraquinone, 22.0 g of 1,4-dichloro-6-nitroanthraquinone obtained according to paragraph (c), 10.5 g of Na₂CO₃ and 0.5 g of Cu powder are added to 300 ml of nitrobenzene. The melt is heated for 12 hours at 205° to 210° C., and is then evaporated in vacuo at 130° to 140° C. 65.3 g of a dark powder having a residual content of organically bonded chlorine of 0.4 to 0.6% are obtained.

(b) 14.0 g of AlCl₃ are added at 60° to 80° C. to 80 ml of pyridine, followed at 100° C. by 200 g of the trianthrimide obtained according to paragraph (a). The melt is raised to a boiling temperature of 135° C., while 20 to 30 ml of pyridine are distilled off, and this temperature is maintained for 2 to 4 hours. The workingup, which corresponds to paragraph (b) of Example 1, produces 17.2 g of a dyestuff which, in hue, deviates somewhat from the dyestuff of Example 1.

(c) 80 g of a mixed acid containing 33% of HNO₃ are added dropwise at 5° to 10° C. in the course of 2 to 4 hours to a solution of 110.0 g of 1,4-dichloroanthraquinone in 600 ml of 96% strength H₂SO₄. The mixture is allowed slowly to warm to room temperature, and is then stirred for a further few hours, and the precipitated 1,4-dichloro-5-nitroanthraquinone (112.6 g) is filtered off with suction. The mother liquor is stirred into 2 liters of water. The solids are then filtered off with suction, and the press cake is washed with water until neutral and dried at 100° C. 12.7 g of 1,4-dichloro-6-nitroanthraquinone are isolated.

A further method for preparing 1,4-dichloro-6-nitroanthraquinone goes as follows: 2-nitroanthraquinone, instead of an identical amount of 1-nitroanthraquinone, is treated with chlorine as in Example 5 of German Auslegeschrift No. 1,162,252 until a chlorine content of 21.5% is reached. A corresponding working-up produces 51 g of 1,4-dichloro-6-nitroanthraquinone.

EXAMPLE 5

(a) 36.0 g of 1-amino-6-chloroanthraquinone, 25.0 g of approximately 80% pure 1,4-dichloro-5-nitroanthraquinone, 9.2 g of Na₂CO₃, 0.6 g of CuCl and 0.5 g of copper powder are added to 300 ml of nitrobenzene, and the mixture is heated with stirring for 16 hours at 200° C. After the nitrobenzene has been distilled off in vacuo, 67.2 g of a salt-containing product are obtained.

(b) 13.0 g of AlCl₃ are dissolved at 60° to 80° C. in 80 ml of pyridine. After the solution has been warmed to 100° C., 20.0 g of the product obtained according to paragraph (a) are added, and the melt is heated to 135° C. while pyridine is distilled off. This temperature is maintained for 4 hours, the warm melt is then stirred into a mixture of 1 liter of water and 180 ml of 50% strength sodium hydroxide solution, the pyridine is distilled off with steam, and the suspension is treated for 1 hour at 70° C. with 30 ml of chlorine liquor. After the solids have been filtered off with suction, washed with hot water until neutral and dried at 100° C., 18.1 g of a dyestuff which dyes similarly to that of Example 1 are obtained.

(c) Very similar dyestuffs are obtained when mixtures of 1-amino-6- and 1-amino-7-chloroanthraquinone or, however, pure 1-amino-7-chloroanthraquinone are used instead of 1-amino-6-chloroanthraquinone.

EXAMPLE 6

(a) A mixture of 25.0 g of about 80% pure 1,4-dichloro-5-nitroanthraquinone, 42.0 g of 74% pure 1-aminoanthraquinone as obtained according to Example 2b of European Offenlegungsschrift 1,087, 11.5 g of Na₂CO₃ and 0.5 g of copper powder is heated for 6 hours at 195° to 200° C. in 250 ml of nitrobenzene, and a further amount of 0.5 g of copper powder is added. After the mixture has been diluted with 50 ml of methanol, the solids are filtered off with suction at room temperature, washed with 50 ml of methanol and dried at 100° C. 53.6 g of a product are obtained.

(b) The carbazolation analogously to paragraph (b) of Example 1 produces a dyestuff which dyes cotton similarly to the dyestuff of Example 1. 86.7% pure 1-aminoanthraquinone, obtained according to Example 5(b) of European Offenlegungsschrift No. 1,087, can be used without disadvantage instead of the 74% pure 1-aminoanthraquinone.

EXAMPLE 7

(a) 25.0 g of a mixture of 1,4-dichloro-5-nitroanthraquinone and 1,4-dichloro-6-nitroanthraquinone, as obtained by pasting the crude nitration mixture according to Example 4(c) and a corresponding working-up, 36.0 g of 1-aminoanthraquinone, 9.0 g of $Na_2CO_3$ and 1.0 g of copper powder are added to 200 ml of nitrobenzene, and the mixture is stirred. The melt is heated for 12 hours at 200° C. and then evaporated in vacuo. 65 g of a salt-containing product are obtained.

(b) The carbazolation analogously to Example 1(b) produces a dyestuff which, in hue and tinctorial strength, is similar to the dyestuff of Example 1.

EXAMPLE 8

(a) 0.2 g of the dyestuff obtained according to Example 1(b), 0.4 g of sodium dithionite and 1.4 ml of NaOH (38% strength) are added at 50°–55° C. to 160 ml of water. 40 ml of a 10% strength sodium sulphate solution are added after 15 minutes. 10 g of cotton yarn are introduced into the vat thus obtained, and dyeing is carried out for 1 hour at 50°–55° C. while the yarn is continuously agitated. The yarn is squeezed off, oxidised for 10–15 minutes in air, rinsed, treated for 5 minutes in the cold with 0.2% strength acetic acid, rinsed again, soaped off for 20 minutes at the boil, rinsed again and dried at 80° C.

The yarn is coloured very levelly in a chocolate-brown shade.

(b) If 0.6 g of the dyestuff, instead of 0.2 g are used in (a) and the amount of sodium dithionite, NaOH and $Na_2SO_4$ is doubled, a deep dark-brown yarn dyeing of good fastness level is obtained.

We claim:

1. Nitrotrianthrimidecarbazoles of the formula

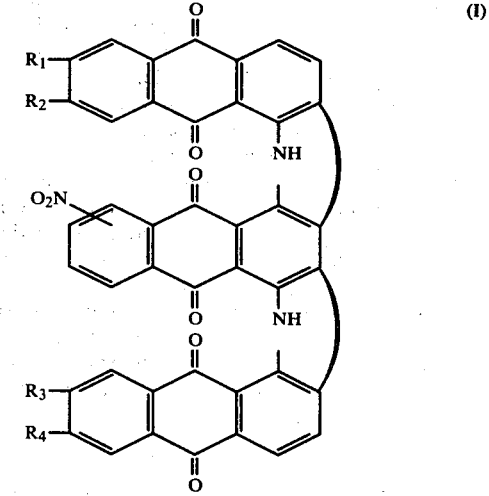

in which
the $NO_2$ group is in the α- or β-position and
$R_1$, $R_2$, $R_3$ and $R_4$ designate hydrogen or halogen, such as chlorine and bromine.

2. Compound according to claim 1, in which the $NO_2$ group is in the α-position and $R_1$, $R_2$, $R_3$ and $R_4$ designate hydrogen.

* * * * *